(12) United States Patent
Ikeda et al.

(10) Patent No.: US 8,655,592 B2
(45) Date of Patent: *Feb. 18, 2014

(54) NAVIGATION APPARATUS

(71) Applicant: Denso Corporation, Aichi-Pref. (JP)

(72) Inventors: Yoshiyasu Ikeda, Toyota (JP); Seiji Kato, Toyota (JP)

(73) Assignee: Denso Corporation, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/726,312

(22) Filed: Dec. 24, 2012

(65) Prior Publication Data

US 2013/0166205 A1 Jun. 27, 2013

(30) Foreign Application Priority Data

Dec. 26, 2011 (JP) ................. 2011-283888

(51) Int. Cl.
*G08G 1/123* (2006.01)

(52) U.S. Cl.
USPC ............ 701/533; 701/1; 701/23; 701/25; 701/410; 701/417; 340/988; 340/990; 340/995.1; 340/995.19; 340/995.2; 707/769; 342/357.31

(58) Field of Classification Search
USPC ........ 701/1, 23, 25, 410, 417, 425, 428, 430, 701/431, 432, 436, 437, 438, 446, 457, 461, 701/467, 516, 532, 533; 340/988, 990, 340/995.1, 995.19, 995.2, 995.21, 995.22; 707/769; 342/357.31
See application file for complete search history.

(56) References Cited

U.S. PATENT DOCUMENTS

| | | | | |
|---|---|---|---|---|
| 6,459,387 B1 * | 10/2002 | Kobayashi et al. | ........... | 340/988 |
| 7,539,574 B2 * | 5/2009 | Takashima et al. | ........... | 701/457 |
| 7,627,420 B2 * | 12/2009 | Ujino | ............ | 701/440 |
| 7,792,636 B2 * | 9/2010 | Ujino | ............ | 701/439 |
| 2006/0217882 A1 * | 9/2006 | Takashima et al. | ........... | 701/208 |
| 2008/0208466 A1 * | 8/2008 | Iwatani | ........... | 701/211 |
| 2011/0172913 A1 * | 7/2011 | Nakamura et al. | ............ | 701/208 |
| 2012/0197525 A1 | 8/2012 | Noro et al. | | |
| 2012/0232789 A1 * | 9/2012 | Nakamura | .................... | 701/430 |
| 2013/0166205 A1 * | 6/2013 | Ikeda et al. | .................... | 701/533 |
| 2013/0173158 A1 | 7/2013 | Shimomura et al. | | |

FOREIGN PATENT DOCUMENTS

| | | |
|---|---|---|
| JP | A-H6-088733 | 3/1994 |
| JP | A-2006-125883 | 5/2006 |
| JP | 2013-092458 A | 5/2013 |

OTHER PUBLICATIONS

U.S. Appl. No. 13/537,505, filed Jun. 29, 2012, Tsutsumi et al.

* cited by examiner

*Primary Examiner* — McDieunel Marc
(74) *Attorney, Agent, or Firm* — Posz Law Group, PLC

(57) ABSTRACT

In a navigation apparatus, when a new road is learned based on a travel trace of a vehicle and a new road link representing the learned new road is connected to an existing link, the navigation apparatus designates the existing link as a base link and generates a new link extending along the existing link as a supplement link. In order to set a target point to one link, the navigation apparatus determines whether or not the supplement link is present at the one link. When the supplement link is present at the target point, the navigation apparatus sets the target point to the supplement link.

5 Claims, 7 Drawing Sheets

BEFORE LEARNING

LEARNED ROAD DETECTING

SUPPL-LINK GENERATING

SIMPLIFY

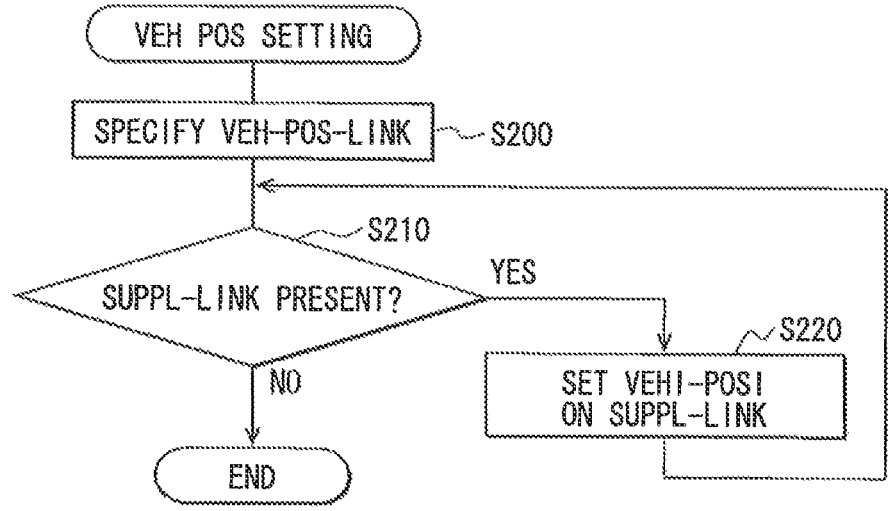
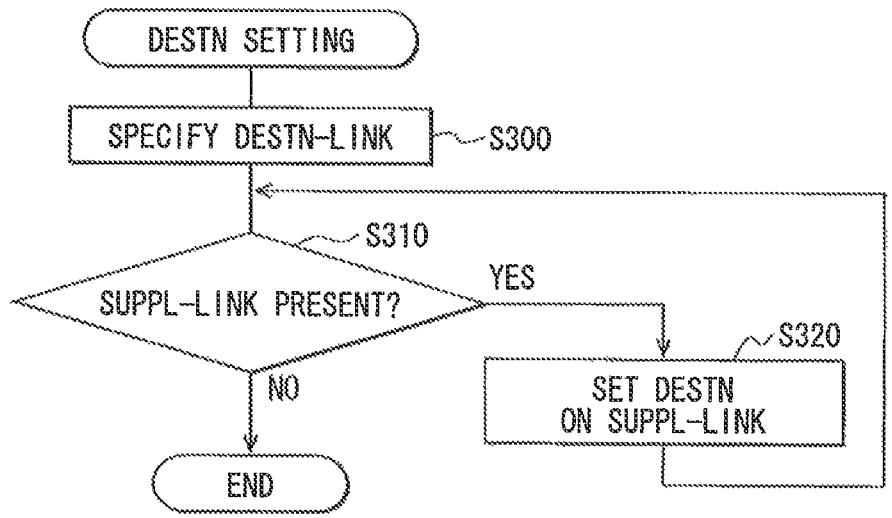

NAVIGATION APPARATUS

CROSS REFERENCE TO RELATED APPLICATION

The present application is based on Japanese Patent Application No. 2011-283888 filed on Dec. 26, 2011, disclosure of which is incorporated herein by reference.

TECHNICAL FIELD

The present disclosure relates to a navigation apparatus that performs a route guidance based on a map data. In particular, the present disclosure relates to a navigation apparatus that learns a new road absent in a ready-made map data based on a travel trace of a vehicle.

BACKGROUND

For adding a new road to a map data used in a navigation apparatus, a map manufacturer edits and adds a road data with map edit software and performs a full update or an increment update of the map data. For this updating, measurement vehicles dedicated to the map manufacturer travel and collect a road data, and thereafter, the map manufacturer makes a map data for several months and then distributes the map data to users. Thus, it takes a long time to collect the road data and create the map data. This long time degrades freshness of the ready-made map data because of a real-world change in road feature.

In this relation, a proposed navigation apparatus learns a new road unregistered in the ready-made map data based on a movement trace of a movable body such as a vehicle and the like (see Patent Documents 1 and 2). A road learning function generates and records a new road (a learned road) absent in the ready-made map data, based on a movement trace from a point where present position of the movable body departs from a prestored road in the map data to a point where the present position of the movable body returns to the prestored road in the map data.

Patent Document 1: JP-H6-88733A
Patent Document 2: JP-2006-125883A

In the road learning, it may be preferable to add a learned road data to a ready-made map data without changing the ready-made map data. This is because once the ready-made map data is changed, it becomes difficult to ensure map data integrity when the map manufacturer performs the incremental update of the ready-made map data.

However, when both of the prestored road in the ready-made map data and the learned road are present, a guidance route different than an actual road condition may be set depending on a data structure associating the prestored road and the learned road.

SUMMARY

In view of the foregoing, it is an object of the present disclosure to provide a navigation apparatus that can set an appropriate guidance route even when the navigation apparatus employs a technique of adding and using a learned road without changing a ready-made map data.

According to one example of the present disclosure, a navigation apparatus comprises a supplement link generation device, a supplement link search device and a point setting device. When: a new road absent in a ready-made map data is learned based on a travel trace of a vehicle; and a new road link representing the learned new road is connected to one of a prestored link in the ready-made map data and an previously-learned link, the supplement link generation device designates the one of the prestored link and the previously-learned link as a base link, and generates a new link extending along the base link as a supplement link so that one end of the supplement link is at a base-link-side end point of the new road link and the other end of the supplement link is at an end point of the base link. In order to set a target point to one link, the supplement link search device determines whether or not the supplement link is present at the one link, wherein the target point is a point for an end of a guidance route. When the supplement link search device determine that the supplement link is present at the one link, the point setting device sets the target point to the supplement link.

According to this configuration, the navigation apparatus can set an appropriate guidance route even when the navigation apparatus employs a technique of adding and using a learned road without changing a ready-made map data.

BRIEF DESCRIPTION OF THE DRAWINGS

The above and other objects, features and advantages of the present disclosure will become more apparent from the following detailed description made with reference to the accompanying drawings. In the drawings:

FIG. 5 is a flowchart illustrating a vehicle position setting process;

FIG. 6 is a flowchart illustrating a destination setting process;

DETAILED DESCRIPTION

Figure 1:
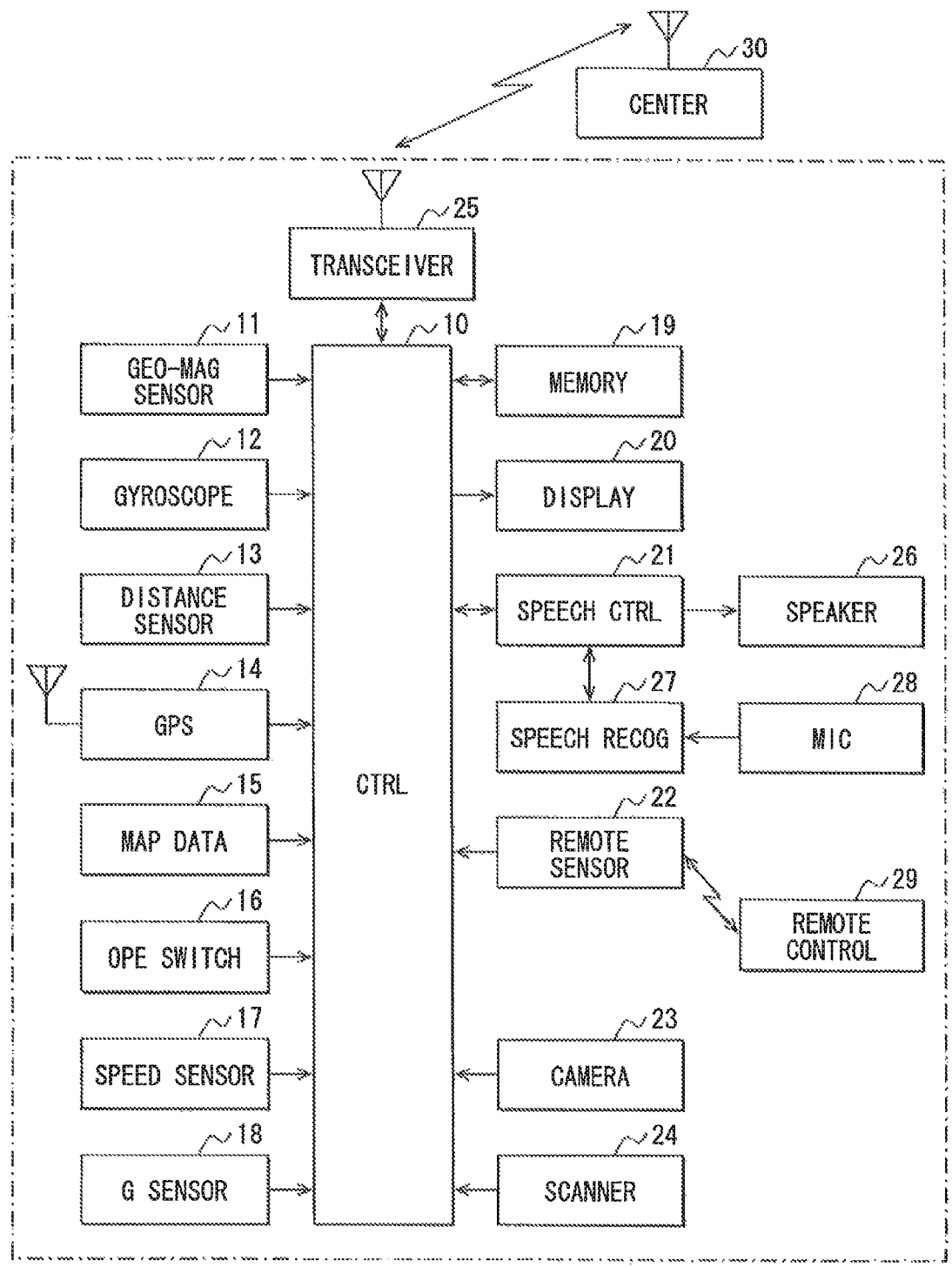
FIG. 1 is a block diagram illustrating a navigation apparatus.

Embodiments will be described with reference to the drawings. A navigation apparatus illustrated in FIG. 1 is mounted to a vehicle and includes a controller 10. The controller 10 may be configured as a computer system including a CPU, a ROM, a RAM, an I/O, and a bus line connecting these components.

The controller 10 is connected with a geomagnetic sensor 11, a gyroscope 12, a distance sensor 13, a GPS receiver 14, a map data input device 15, a group of operation switches 16, a speed sensor 17, a G sensor 18, an external memory device 19, a display device 20, a speech controller 21, a remote control sensor 22, a camera 23, and a scanner 24.

The geomagnetic sensor 11 detects orientation of the vehicle based on geomagnetism. The gyroscope 12 outputs a detection signal that depends on an angular velocity of rotation movement of the vehicle. The distance sensor 13 outputs a travel distance of the vehicle. The GPS receiver 14 receives signals from artificial satellites of Global Positioning System (GPS), and detects a coordinate point and an altitude of the vehicle. With these components, the controller 10 can calculate present position, heading direction and speed of the vehicle. Various methods can be used as a method of obtaining the present position based on an output signal from the GPS receiver 14. For example, a single point positioning or a relative positioning may be used.

The map data input device 15 inputs a map data to the controller 10. The map data may be stored in a storage such as a hard disk drive (HDD) and the like and may be inputted to the controller 10 via the map data input device 15. The storage may be other than HDD, and may be CD, DVD-ROM, or the like. The map data includes a road data, a graphic data, a data for map matching, a data for route guidance, and the like. The road data includes a data of nodes and links. The node corresponds to a specific point such as an intersection or the like. The link connects nodes.

The group of operation switches 16 allows a user to input various instructions. The group of operation switches 16 may be provided with mechanical pressing-type switches and/or a touch panel integrated with the display device 20.

The speed sensor 17 detects speed of the vehicle. The G sensor 18 detects acceleration of the vehicle. The external memory device 19 is a storage such as HDD and the like, and is provided to store a data of a learned road acquired in a road learning process. From the external memory device 19, the data of a learned road is inputted to the controller 10. When a new road absent in the ready-made map data is detected in the road learning process, a learned road data and a supplement link data associated with the detected new road are generated and stored in the external memory device 19.

The learned road data includes a data of a link and a node, which represents the learned new road. For example, the learned road data includes attributes of the link and the node, a shape data, and the like. The supplement link data includes a data of supplement link and supplement node. The supplement link specifies a connection state between the learned road and the prestored road. The supplement node is a node provided at an end of the supplement link.

The supplement link data is used as an alternative to the road data of the prestored road in navigation-related processes. Because of this, the prestored road in the ready-made map data and the learned road in the learned road data are logically connected to each other, and a map integrity is ensured without partial update of the ready-made map data. In other words, because the supplement link specifies the connection state between the learned road and the prestored road, it is unnecessary to change or update the ready-made map data in order to logically connect the learned road and the prestored road.

The display device 20, which may include a liquid crystal display, displays a map and a variety of information. The display device 20 is used to display not only a map image but also a guidance route, the present vehicle position and other guidance informations.

The speech controller 21 controls sound and speech. The speech controller 21 is connected to the speaker 26 for outputting guidance speech. Thus, the speaker 26 can provide information to a user as well as the display device 20 can. The speech controller 21 is connected to a speech recognition device 27 and receives a speech signal representing a speech that is inputted from a user via a microphone 28 and recognized by the speech recognition device 27. Because of this, a user can input various instructions in the form of speech.

The remote control sensor 22 receives a signal from a remote control terminal (abbreviated as a remote control) 29 and outputs the received signal to the controller 10. Because of this, a use can input various instructions by using the remote control.

The camera 23 may be a CCD camera or the like. The camera 23 captures a vehicle periphery image. The scanner 24 scans a vehicle periphery. A transceiver 25 performs data communication with an external center 30.

When the vehicle travels an area other than a prestored road present in the ready-made map data and a previously-registered learned road, the navigation apparatus of the present embodiment performs a road learning operation. Specifically, the learned road data and the supplement link data are generated based on the movement trace of the vehicle, and then, the learned road data and the supplement link data are recorded in the external memory device 19. The controller 10 reads out the learned road data and the supplement link data in addition to the ready-made map data from the map data input device 15, and performs processing to ensure a map data integrity, and uses the processed data in a map display process and a route guidance process.

Figure 2:
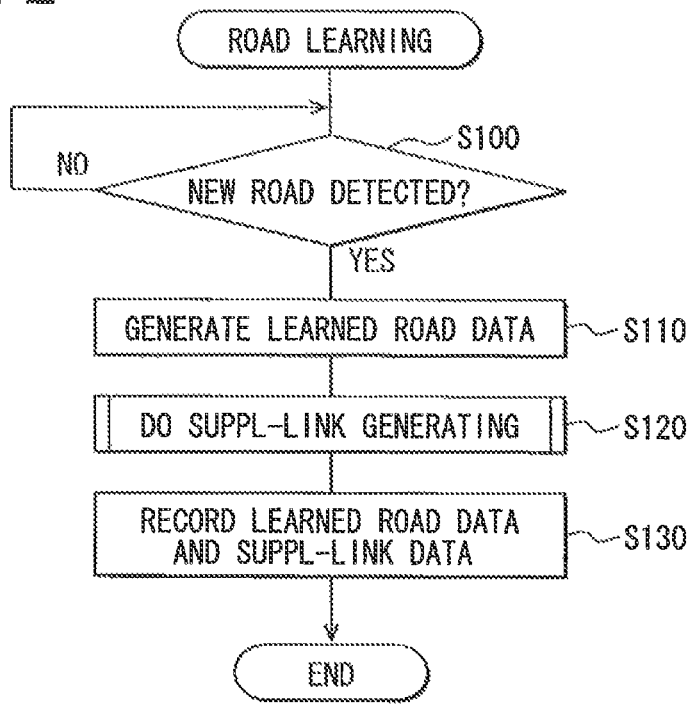
FIG. 2 is a flowchart illustrating a road learning process.

Next, the road learning process will be described. FIG. 2 is a flowchart illustrating the road learning process. The road learning process is performed by the controller 10 when the vehicle is traveling. At S100, the controller 10 determines whether or not a new road is detected. Specifically, the present vehicle position is periodically specified. When the present vehicle position departs from a map road link present in the ready-made map data or a previously-registered learned road link and thereafter the present vehicle position returns to the map road link present in the ready-made map data or the previously-registered learned road link, the controller 10 determines that the new road is detected. In the present disclosure, both of the map road link present in the ready-made map data and the previously-registered learned road link are collectively is defined as an existing link. When the controller 10 determines that the new road is detected (YES at S100), the process proceeds to S110. When the controller 10 determines that the new road is not detected (NO at S100), the controller 10 repeats S100.

At S110, the controller 10 generates a learned road data. Specifically, the learned road data is generated based on the movement trace from a departed point to a returned point, where the departed point is a point at which the vehicle departs from the existing link, and the returned point is a point at which the vehicle returns to the existing link. The learned road data includes a learned road link (also called a new road link) and a learned road node (also called a new road node). The learned road link is a link from the departed point to the returned point. The learned road node is at an end of the learned road link. For example, the learned road data includes information indicative of a road connection state, a set of shape points indicative of a road shape between the departed point and the returned point, and the like.

At S120, the controller 10 performs a supplement link generation process to generate a supplement link data corresponding to the learned road data generated at S110. Now, the supplement link data is described with reference to FIGS. 3A to 3D. In the present disclosure, the existing link serving as a basis for generating a supplement link data is defined as a base link.

Figure 3A:
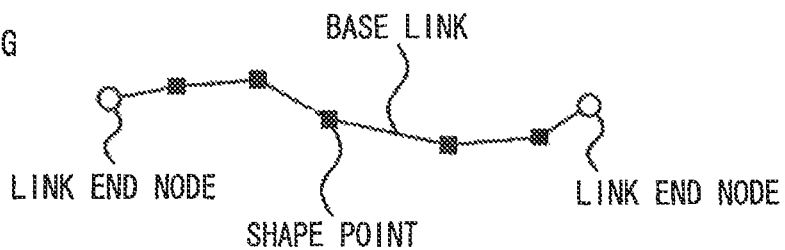
FIGS. 3A to 3D are diagrams illustrating generation of supplement links.
Figure 3B:
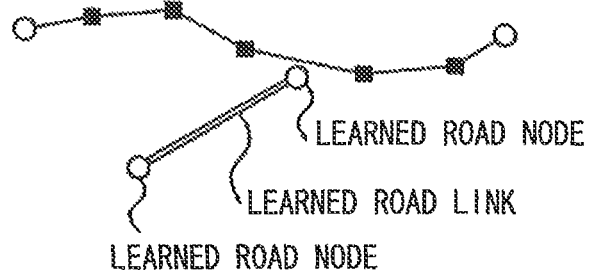

FIG. 3A schematically illustrates a base link and a link end node of the base link before the road learning. The base link includes multiple shape points for indicating shape of this road. The data about the base link and the link end node includes an attribute information concerning class, size, connection destination etc. of this road.

FIG. 36 illustrates that a new road connected to a middle of the base link is detected as a learned road. When the new learned road is detected, a learned road data is generated as illustrated in FIG. 36. Specifically, the controller 10 generates the learned road data including the learned road link extending along the movement trace, and generates the learned road node located at an end of the learned road link.

Figure 3C:
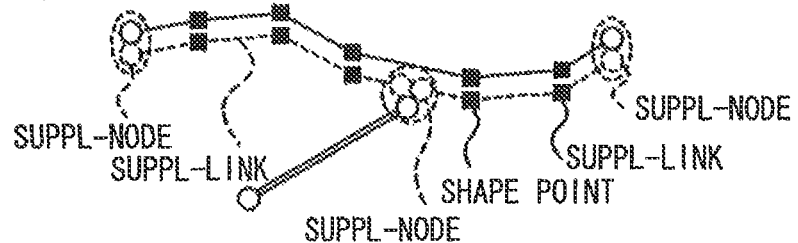

After the learned road data is generated, a supplement link data is generated based on the base link and the link end node of the base link, as illustrated in FIG. 3C. Specifically, the controller 10 generates the supplement link data in such way that: the base link and the link end nodes of the base link are copied; the copied base link is divided at a point (corresponding to a position of the learned road node) where the base link is connected to the learned road link; and the divided base links are designated as supplement links. The supplement node of the supplement link (surrounded by the dashed line in FIG. 3C) is provided with attribute information that associates the supplement node with other node(s) that is present at the same position as the supplement node.

Figure 4:
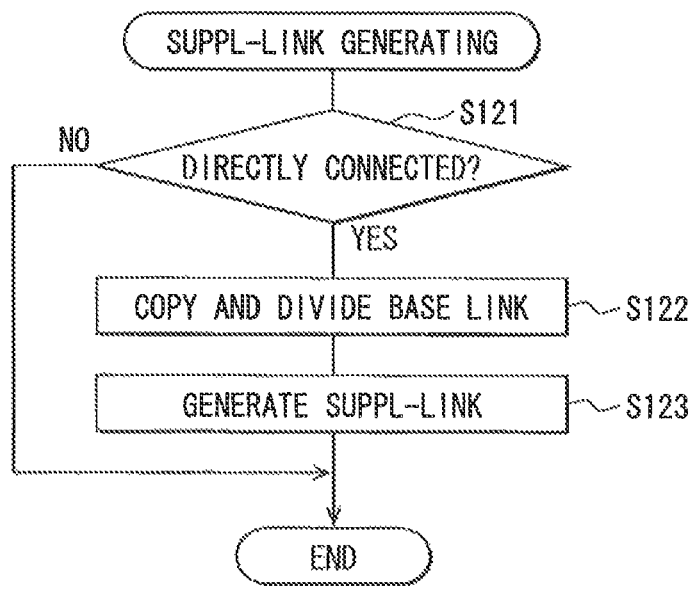
FIG. 4 is a flowchart illustrating a supplement link data generation process in the road learning process.
Figure 3D:
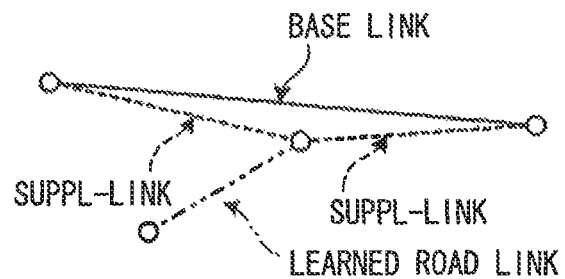

In FIG. 3D, for simplification, the nodes surrounded by the dashed line in FIG. 3C are depicted as one node, and the shape points are omitted. FIG. 4 is a flowchart illustrating a supplement link data generation process.

At S121, the controller 10 determines whether or not both of two learned road nodes, which are opposite ends of the learned road link, are directly connected to link end nodes of base link(s). When both of the two learned road node are directly connected to the link end nodes of the base link(s) (YES at S121), the controller 10 ends the supplement link data generation process and does not perform S122 and S123. When at least one of the two learned road nodes is not directly connected to the link end node of the base link (NO at S121), the process proceeds to S122.

At S122, the base link is copied and the copied base link is divided. Specifically, a base link data is copied as a basis of a supplement link data, and thereafter, the copied base link is divided at the learned road node.

At S123, the controller 10 generates supplement links and supplement nodes as a supplement link data by designating the divided base link as the supplement links and designating end points of the supplement links as link end nodes of the supplement links. After S123, the supplement link data generation process is ended.

Explanation returns to FIG. 2. At S130, the learned road data generated at S110 and the supplement link data generated at S120 are recorded in the external memory device 19. After S130, the road learning process is ended. It should be noted that, as described above, the supplement node has attribute information for associating the supplement node with another node. Accordingly, the stored supplement link data indicates correspondence relation between the supplement link and the base link. Thus, based on the correspondence relation, it is possible to specify the supplement link that corresponds to the base link.

On the promise of the road learning process, the navigation apparatus of the present embodiment is characterized in vehicle position setting (present position detection) and destination setting. Next, a vehicle position setting process performed by the controller 10 will be described.

FIG. 5 is a flowchart illustrating the vehicle position setting process. The controller 10 repeatedly performs the vehicle position setting process while the vehicle is traveling. At S200, the controller 10 detects the preset position of the vehicle and specifies on which link the preset position of the vehicle is present. Specifically, at S200, the controller 10 obtains the present vehicle position by using the geomagnetic sensor 11, the gyroscope 12, the distance sensor 13 and the GPS receiver 14, and specifies on which link the preset position of the vehicle is present. In the above, in some cases, the controller 10 may specify that the vehicle position is present on the base link. In another case, the controller 10 may specify that the present vehicle position is present on the supplement link. The link on which the present vehicle position is present is also referred to herein as a vehicle-position-link.

At S210, the controller 10 determines whether or not the supplement link is present at the vehicle-position-link specified at S200. For example, when the specified vehicle-position-link is the base link, there is the supplement link at this base link. When the controller 10 determines that the supplement link is present at the specified vehicle-position-link (YES at S210), the controller 10 sets the present vehicle position to the supplement link at S220 and then repeats S210. When the controller 10 determines that the supplement link is not present at the specified vehicle-position-link (NO at S210), the vehicle position setting process is ended.

A reason for repeating S210 is that, in some cases, the supplement links have a hierarchical structure and there may be another supplement link at the supplement link. The hierarchical structure of supplement links will be specifically described in later.

FIG. 6 is a flowchart illustrating the destination setting process. The destination setting process is performed when a destination point is set in order to retrieve a guidance route. At S300, the controller 10 specifies on which link the destination point is present. Specifically, when the destination point is set, the controller 10 specifies a destination-position-link, which is the link on which the destination point is present.

At S310, the controller 10 determines whether or not a supplement link is present at the destination-position-link specified at S300. For example, when the specified destination-position-link is the base link, the supplement link is present at this specified destination-position-link. When the controller 10 determines that the supplement link is present at the destination-position-link (YES at S310), the controller 10 sets the destination point to the supplement link at S320, and then repeats S310. When the controller 10 determines that the supplement link is not present at the specified destination-position-link (NO at S310), the destination setting process is ended.

A reason for repeating S310 is that, in some cases, the supplement links have a hierarchical structure and there may be another supplement link at the supplement link.

Now, the hierarchical structure of supplement link will be specifically described.

Figure 7A:
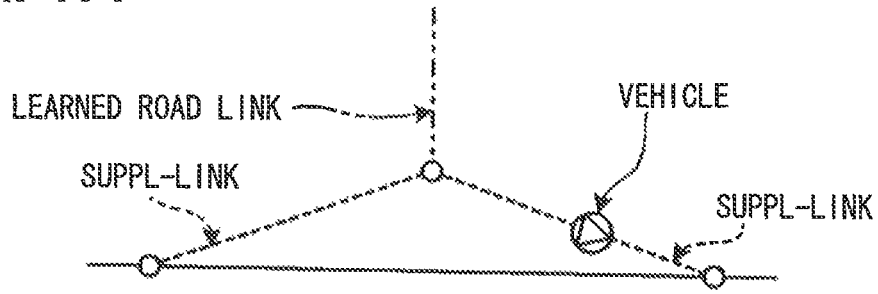
FIGS. 7A to 7C are diagram illustrating a hierarchy structure of supplement links.
Figure 7B:
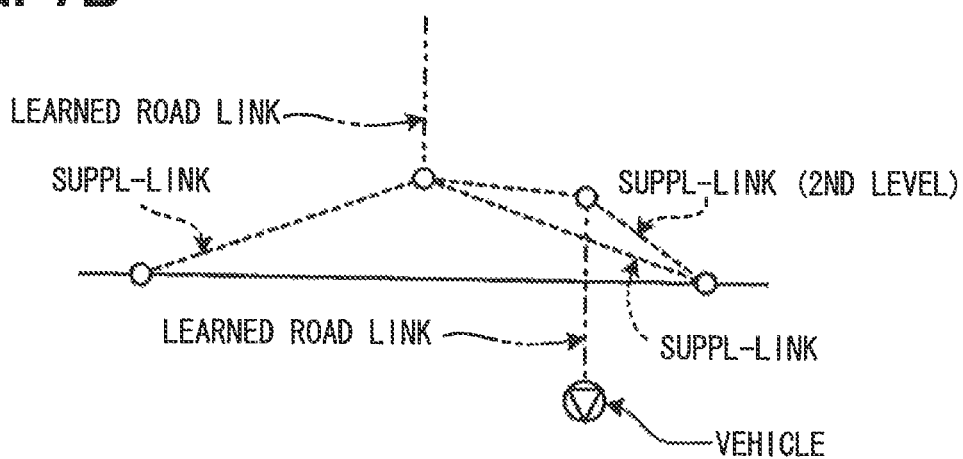
Figure 7C:
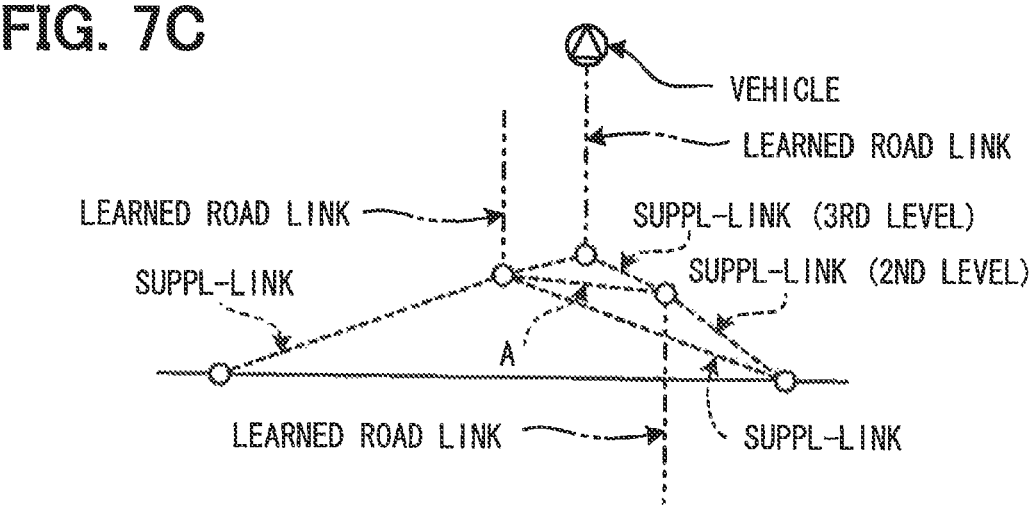

Let us assume a situation of FIG. 7A where the present position of the vehicle is on a supplement link SL1 connected to a previously-learned road link LL1. In this situation, when the vehicle makes a turn into a new road and then reaches an existing link (not shown), a new road link is generated as a learned road link (LL2) as shown in FIG. 7B. In this case, the supplement link SL1 is designated as the base link and a new supplement link SL2 is generated. This new supplement link SL2 is a second level supplement link, which is lower in hierarchy than the supplement link SL1. In a similar manner, when a new road link extending from a point A of the second level supplement link SL2 is generated as a learned road link SL3 as shown in FIG. 7C, a third level supplement link SL3 lower in hierarchy than the second supplement link SL2 is generated. It should be noted that when the supplement links have the hierarchical structure, a number information indicative of the level of each supplement link in the hierarchical structure is assigned to the supplement link.

As described above, the supplement links can have the hierarchical structure. Thus, when the present vehicle position or the destination point is set to a high level supplement link in the hierarchy, the same difficulty arises as when the present vehicle position or the destination point is set to the base link.

In view of this, the controller 10 cyclically makes a determination (S210 and S310) as to whether or not there is another supplement link (lower level supplement link) at the supplement link to which the present vehicle position or the destination point has been set. By cyclically making this determination, the controller 10 sets the present vehicle position or the destination point to the lowest-level supplement link. The determination as to whether or not there is a lower-level supplement link at the supplement link can be made in the following way. First, the controller 10 determines whether or not there is a link associated with an link end node of the supplement link, and then, the controller 10 determines whether or not the number information indicative of the level in the hierarchy, which number information is assigned to the supplement link, shows the presence of a lower-level supplement link.

In cases where the supplement links have the hierarchical structure, the controller 10 may search for a lowest level supplement link. To do so, the controller 10 may search for a supplement link that has, according to the number information, the lowest level among multiple supplement links associated with each other. It should be noted that the supplement link having the lowest level is a latest supplement link, which was most recently generated at the road learning. Thus, the date of learning can be used for the number information Next, advantages of the navigation apparatus of the present embodiment will be illustrated. In the present embodiment, when a new road is detected as a learned road, a learned road link along the travel trace is generated. In this case, the supplement links are generated by copying the base link connected to the learned road link and dividing the copied base link at the connection point between the base link and the learned road link.

When the vehicle is traveling, the navigation apparatus specifies on which link the present vehicle position is present (S200), and thereafter, the navigation apparatus determines whether or not there is a supplement link at the specified link (S210). When there is the supplement link at the specified link (YES at S210), the navigation apparatus sets the present vehicle position to the supplement link (S220).

Figure 8A:
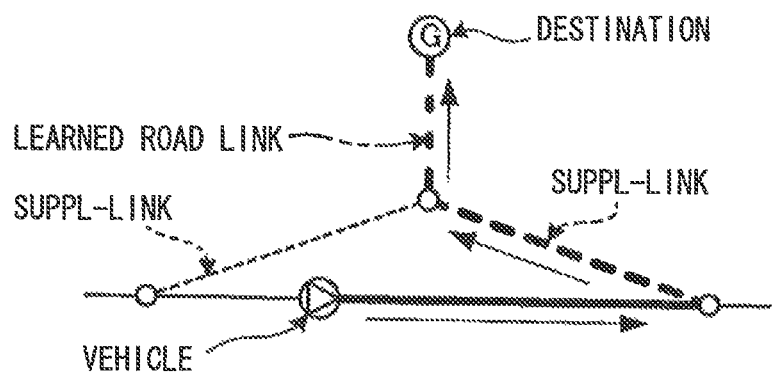
FIGS. 8A and 8B are diagrams illustrating an effect when a vehicle position is set to a supplement link.

In some cases, as shown in FIG. 8A, the present vehicle position is set to the base link and the destination point is set to the learned road link. In this case, one may consider that the navigation apparatus sets such an inappropriate guidance route that turns from the base link back to the supplement link (S220).

Figure 8B:
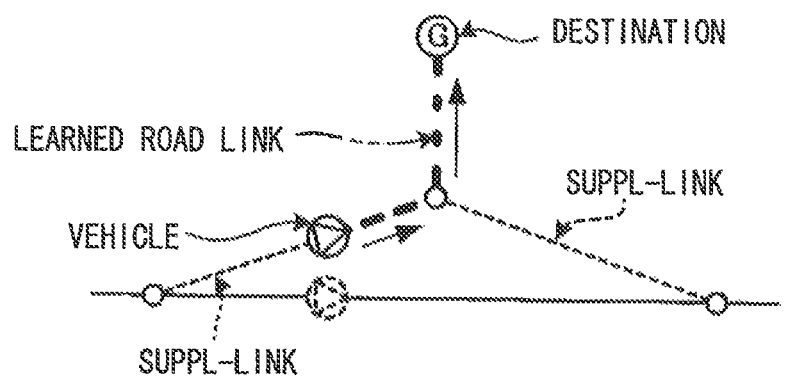

However, in the present embodiment, when the specified ink on which the present vehicle position is present is the base link, the present vehicle position is set to the supplement link, as shown in FIG. 8B. Because of this, it is possible to prevent the navigation apparatus from setting the inappropriate guidance route.

In the present embodiment, when the destination point is set in order to retrieve a guidance route, the navigation apparatus specifies on which link the destination point is present (S300), and thereafter, the navigation apparatus determines whether or not there is a supplement link at the specified link (S310). When there is the supplement link at the specified link (YES at S310), the navigation apparatus sets the destination point to the supplement link (S320).

Figure 9A:
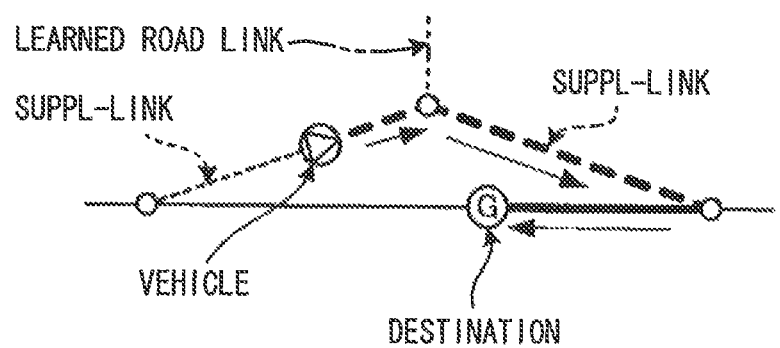
FIGS. 9A and 9B are diagrams illustrating an effect when a destination point is set to a supplement link.

In some cases, as shown in FIG. 9A, the destination point is set to the base link and the present vehicle position is set to the supplement link. In this case, one may consider that the navigation apparatus sets an inappropriate guidance route that turns from the supplement link back to the base link.

Figure 9B:
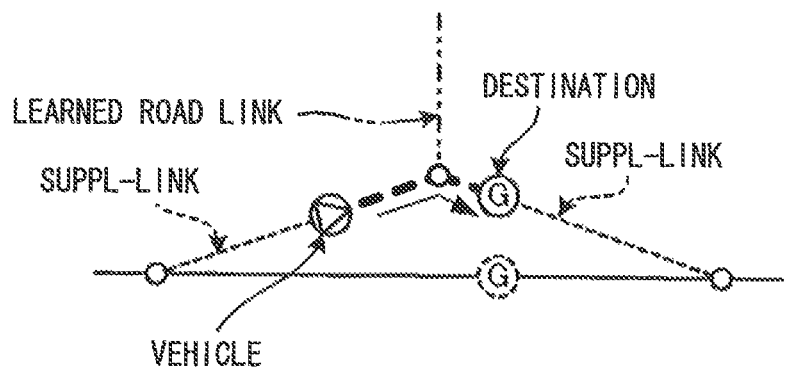

However, in the present embodiment, when the specified link on which the destination point is present is the base link, the destination point is set the supplement link, as shown in FIG. 9B. Because of this, it is possible to prevent the navigation apparatus from setting the inappropriate guidance route.

That is, when a point for an end of the guidance route is set to the supplement link connected to the learned road link, an inappropriate guidance route including turning-back is not set. Therefore, even when the supplement link, which is generated when a learned road is generated, is present, the navigation apparatus can perform an appropriate guidance route.

Moreover, in the present embodiment, the navigation apparatus makes a determination (S210, S310) of whether or not there is a lower-level supplement link at the supplement link to which the present vehicle position or the destination point has been set. By cyclically making this determination, the navigation apparatus sets the present vehicle position or the destination point to a lowest-level supplement link. Therefore, even when the supplement links have the hierarchy structure, it is possible to set an appropriate guidance route.

In the above embodiments, the controller 10 can acts as a supplement link generation means and device, a supplement link search means or device, and a point setting means or device. Additionally, the supplement link data generation process illustrated in FIG. 4 can correspond to functions of the supplement link generation means and device. S210 in FIG. 5 and S310 in FIG. 6 can correspond to functions of the supplement link search means or device. S220 in FIG. 5 and S330 in FIG. 6 can correspond to functions of the point setting means or device.

Additionally, the present vehicle position and the destination point can correspond to a target point for an end of a guidance route.

It should be noted that embodiments are not limited to the above-illustrated embodiment.

In the above embodiment, regardless of setting a guidance route, the navigation apparatus repeatedly performs the vehicle position setting process. Alternatively, the navigation apparatus may perform the vehicle position setting process before searching a guidance route.

According to the present disclosure, a navigation apparatus can be provided in various forms. For example, a navigation apparatus learns a new road absent in a ready-made map data based on a travel trace of a vehicle. Specifically, when the navigation apparatus connects a new road link representing the learned new road to one of a prestored link in the ready-made map data and a previously-learned link, a supplement link search device of the navigation apparatus designates the one of the prestored link and the previously-learned link as a base link, and generates a new link extending along the base link as a supplement link so that one end of the supplement link is at a base-link-side end point of the new road link and the other end of the supplement link is at an end point of the base link, wherein the base-link-side end point of the new road link is a point where the new road link is connected to the base link. Then, in order to set a target point to one link, the supplement link search device of the navigation apparatus determines whether or not the supplement link is present at the one link, wherein the target point is a point for an end of a guidance route. When the supplement link search device determines that the supplement link is present at the one link, a point setting device of the navigation apparatus sets the target point to the supplement link. Note that the base-link-side end point of the new road link is a point where the new road link is connected to the base link.

More specifically, because the supplement link is a link connected to the new road link and the target point is set to the supplement link, it is possible to prevent the navigation apparatus from setting the inappropriate guidance route. Therefore, the navigation apparatus can set an appropriate guidance route even when the navigation apparatus employs a technique of adding and using a learned road without changing a ready-made map data.

By using a certain supplement link as the base link, the navigation apparatus may generate another supplement link with respect to the certain supplement link. In view of this the navigation apparatus may be configured such that the supplement link search device determines whether or not, at the supplement link to which the target point has been set by the point setting device, there is another supplement link; and the point setting device sets the target point to the another supplement link when the supplement link search device determines that there is the another supplement link. According to this configuration, even when the navigation apparatus generates another supplement link by using the supplement link as the base link, the navigation apparatus can set an appropriate guidance route.

When the another supplement link of the supplement link is called a second level supplement link, the supplement links have a hierarchy structure with a first level supplement link, a second level supplement link, a third level supplement link, a fourth level supplement link and so on. In view of this, the navigation apparatus may be configured such that when the supplement links have hierarchy, the supplement link search device searches a lowest hierarchy supplement link and the point setting device sets the target point to the lowest hierarchy supplement link searched by the supplement link search device. According to this configuration, even when the supplement links have a hierarchy structure, the navigation apparatus can set an appropriate guidance route.

The target point, which is the point for the end of the guidance route, may be a present position of the vehicle. In this case, regardless of setting a guidance route, the navigation apparatus may set the detected present position of the vehicle to the supplement link. Alternatively, in setting the guidance route, the navigation apparatus may set the detected present position of the vehicle to the supplement link. According to this configuration, since the present position of the vehicle, which can be a point for an end of a guidance route, is set to the supplement link, the navigation apparatus can set an appropriate guidance route.

Additionally, the target point, which is the point for the end of the guidance route, may be a destination point that is set in searching for the guidance route. The destination point includes so called a via-point. According to this configuration, since the destination point, which can be a point for an end of a guidance route, is set to the supplement link, the navigation apparatus can set an appropriate guidance route.

It should be noted that the present disclosure is not limited the above embodiments and modifications thereof. That is, the above embodiments and modifications thereof may be modified in various ways without departing from the sprit and scope of the present disclosure.

What is claimed is:

1. A navigation apparatus comprising:
    a supplement link generation device for, when: a new road absent in a ready-made map data is learned based on a travel trace of a vehicle; and a new road link representing the learned new road is connected to one of a prestored link in the ready-made map data and an previously-learned link,
        designating the one of the prestored link and the previously-learned link as a base link, and
        generating a new link extending along the base link as a supplement link so that one end of the supplement link is at a base-link-side end point of the new road link and the other end of the supplement link is at an end point of the base link;
    a supplement link search device for, in order to set a target point to one link, determining whether or not the supplement link is present at the one link, wherein the target point is a point for an end of a guidance route; and
    a point setting device for setting the target point to the supplement link when the supplement link search device determine that the supplement link is present at the one link.

2. The navigation apparatus according to claim 1, wherein:
    the supplement link search device determines whether or not, at the supplement link to which the target point has been set by the point setting device, there is another supplement link; and
    when the supplement link search device determines that there is the another supplement link, the point setting device sets the target point to the another supplement link.

3. The navigation apparatus according to claim 1, wherein:
    when a plurality of supplement links, each generated by the supplement link generation device, has hierarchy, the supplement link search device searches a lowest hierarchy supplement link and the point setting device sets the target point to the lowest hierarchy supplement link searched by the supplement link search device.

4. The navigation apparatus according to claim 1, wherein the target point, which is the point for the end of the guidance route, is a present position of the vehicle.

5. The navigation apparatus according to claim 1, wherein the target point, which is the point for the end of the guidance route, is a destination point that is set in searching for the guidance route.

* * * * *